9125X
T. Odiorne,
Steam-Boiler Indicator.
Patented Sep. 26, 1835.
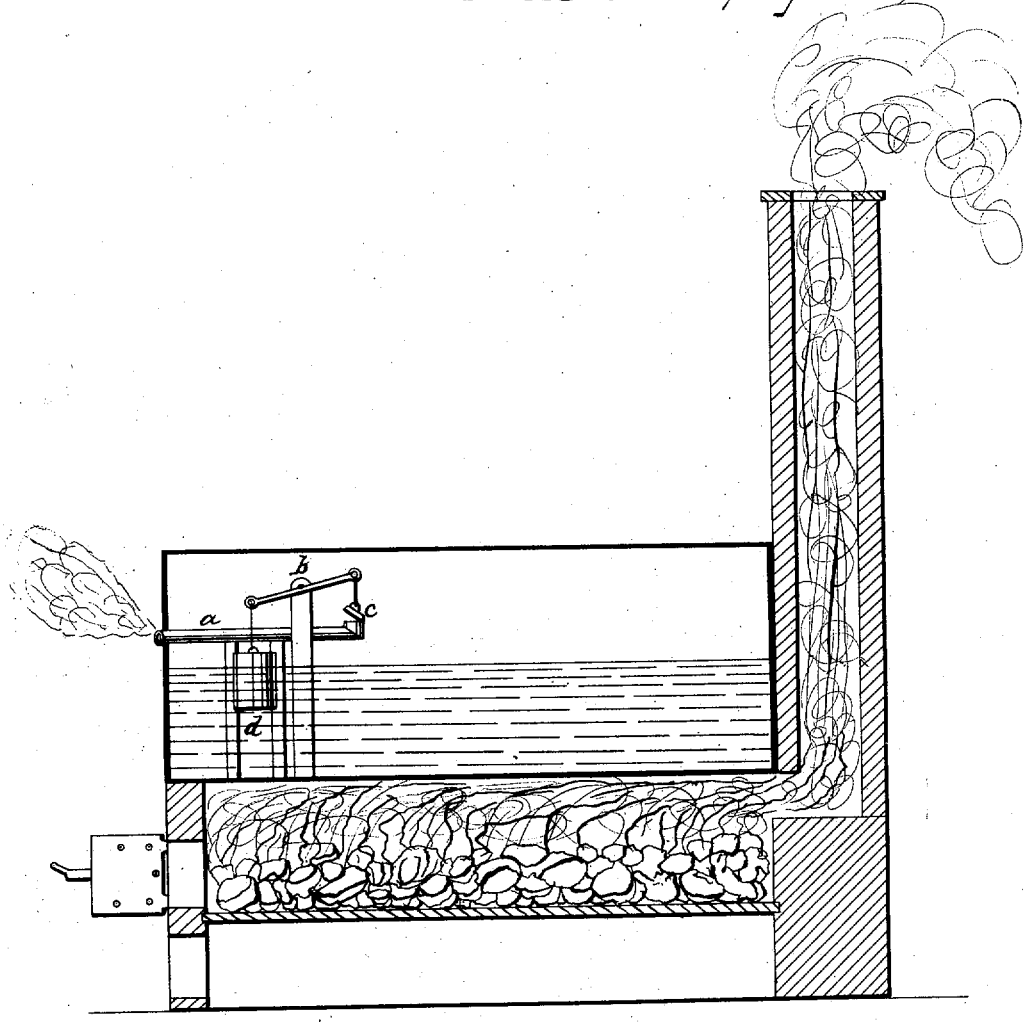
N. PETERS, PHOTO-LITHOGRAPHER, WASHINGTON, D. C.

Thomas Odiorne - of Maldon, Massachusetts.

Letters Patent,

The schedule referred to in these Letters Patent and making part of the same containing a description in the words of the said Thomas Odiorne himself of his improvement in the management of Steam for the purpose of giving notice when the water is low in the boiler.

To all to whom these presents shall come

Be it known that I Thomas Odiorne of Malden, County of Middlesex & commonwealth of Massachusetts, have invented a new and useful improvement, for the purpose of giving an alarm when the water is low and perilous in a Steam boiler. This is done by means of a tube extending from without to the inside of the Boiler, through a fixed standard erect within & through the side or ends of said Boiler, as the case may require, to which standard is attached, a lever valve closed by a spring, & opened by a sliding buoy, which as it settles down upon the falling surface of the water presses upon the lever opening the valve when the escaping steam gives the alarm. — This may be done by a Racket wheel, by a Buzz, by a Bell, or by a Trumpet &c. The whole of this apparatus as applied & exemplified in my draft & model which I shall speedily forward I Claim Witnesses
Ephraim Buck }
John Buck }

Thomas Odiorne 324 w-ds]

[illegible]